Patented Jan. 8, 1935

1,987,053

UNITED STATES PATENT OFFICE 1,987,053

PROCESS OF MAKING CELLULOSE ESTERS AND THE PRODUCTS RESULTING THEREFROM

Hans T. Clarke, New York, and Carl J. Malm, Rochester, N. Y., assignors to Eastman Kodak Company, Rochester, N. Y., a corporation of New York No Drawing. Application March 4, 1931, Serial No. 520,150

31 Claims. (Cl. 260—101)

This invention relates to processes of making organic esters of cellulose employing an organic acid and an alkoxy substituted fatty acid anhydride. This application is in part a continuation of our applications 179,176, and 179,177, both of which were filed March 28, 1927, which have matured into Patents 1,800,860 and 1,880,808 respectively.

One object of the invention is to provide a process whereby cellulose esters of many different organic acids, either simple or mixed, may be prepared. Our process allows the preparation of many organic esters of cellulose which have been either difficult or impossible to prepare heretofore.

Another object of our invention is to provide a process in which cellulosic material may be directly esterified by the organic acids themselves. Before our invention it has been necessary in the processes of preparing cellulose esters to use either the anhydride or the chloride of the fatty acid. In the present process, as in our above applications, the esterification may be carried out without the use of the anhydride or chloride of the acid which is to furnish desired acyl groups.

Another object of our invention is to provide a cellulose-esterifying process in which, as a main initial ingredient, there is an anhydride of an organic acid, which anhydride does not itself esterify the cellulose or hydrolyze to an acid containing an esterifying group. However, the anhydride does impel the esterification of the cellulosic material by the organic acid that may be present.

Another object of our invention is to provide a process which will esterify not only easily esterified cellulosic bodies such as hydrocellulose and reverted cellulose, but can also utilize substantially undegraded cellulose such as cotton, surgical cotton wool, tissue paper from cotton stock, and sulfite wood pulp, thereby producing cellulose esters of high quality. Also other cellulosic materials such as cellulose ethers, incompletely acetylated or nitrated cellulose may also be further acylated by our process, regardless of whether the cellulose was first fully acylated and then hydrolyzed or was only partially acylated in the initial esterification. A still further object is to provide a process which as it proceeds, by hydration of the anhydride employed, produces a solvent that helps to keep the esterifying ingredients in solution.

A further object of this invention is to provide a new solvent for cellulose esters such as we produce. As pointed out, this new solvent may be produced in the reaction mass by the hydration of the anhydride which we use or if desired additional amounts of this solvent may be added directly to the solution. These new solvents (alkoxy fatty acids) for cellulose esters have been found to be as effective for all practical purposes or even more so than glacial acetic acid but do not contribute acyl groups to the ester which is unavoidable in the employment of acetic acid in the presence of an impelling anhydride.

A still further object of this invention is the provision of valuable cellulose esters of properties which are more advantageous for many purposes than the cellulose esters now commonly employed in the manufacture of plastics. Our esters which contain higher fatty acid groups have been found to have a much greater solubility than the esters which do not contain these higher groups both as to the solvents in which both types of esters are soluble and as to the solvents in which the ordinary organic cellulose esters are insoluble. For example, our products are soluble in chloroform, acetone and methyl acetate but in the case of the cellulose acetates, a material that is soluble in chloroform will often be found to be insoluble in acetone and vice versa.

We have found that the above objects may be attained, in general, by subjecting the cellulosic material to the co-action of an organic acid containing a cellulose-esterifying group and an alkoxy substituted aliphatic acid anhydride which impels the esterification without itself supplying any cellulose-esterifying groups. By the term cellulose-esterifying groups, we refer to those groups which are capable of combining with the cellulose under the conditions of our process. The organic acids which we can employ for furnishing such groups can be selected from the group which consists of the unsubstituted aliphatic monocarboxylic acids including the cycloparaffinic, the aromatic monocarboxylic acids and the aralkyl monocarboxylic acids; the anhydrides that we have found particularly suitable in our process are the alkoxy substituted anhydrides of the fatty acids such as methoxy or ethoxy acetic anhydrides, all as described in our above copending applications.

The alkoxy aliphatic anhydride present in the reaction mass takes up any moisture which may be present and a certain amount of alkoxy aliphatic acid is formed which acts as a solvent for the ingredients of the bath. However, as is frequently desired, further solvent may be added, preferably such solvents as glacial acetic acid, methoxy or ethoxy acetic acid (or their esters with the lower aliphatic alcohols such as methyl, ethyl, propyl and butyl), or ethylene chloride, if desired to aid the thinness and fluidity of the mass. The alkoxy acetic acids are particularly useful as solvents in this process.

The time of the process is shortened and the results are more advantageous when a catalyst is employed. Any of the well-known catalysts which are used in acylation of cellulose may be employed, however, we prefer the milder types of catalyst such as the perchlorates disclosed in United States Patent No. 1,645,915 of C. J. Malm. Zinc chloride, the red phosphorus and chlorine of United States Patent No. 1,591,590 of Malm and Webb, and aromatic sulfur containing catalysts such as benzene-sulfonic-acid, or paratoluene-sulfo-chloride may also be employed in our process. Of course, almost any of the usual acylation catalysts known to those skilled in the art may be employed under the proper regulation of conditions.

If desired, the esterification may be carried out in the presence of a non-solvent such as ligroin. In that case a dope is not formed but the cellulose after its acylation remains in fibrous form. This eliminates the step of precipitating which is necessary in the acylation processes carried out in the presence of a solvent. However, we have found that the acylation is less uniform in fibrous acylation than in the dope forming processes according to our preferred methods. Example VII is an illustration of this type of acetylation.

Our process is carried out at temperatures above the melting point of the esterifying bath, but below temperatures at which the cellulose, or the esters made from it are degraded. Such degradation is indicated by brittleness of sheets prepared from the esters. It should be noted that when the ingredients of our baths are mixed together the mixture usually has a lower melting point than the melting points of the ingredients, taken alone. It should be further noted that the alkoxy substituted fatty acid anhydrides, especially those derived from the simple fatty acids containing less than 10 carbon atoms have a pronounced solvent action upon the acids which we employ. For instance, methoxy acetic anhydride has a good solvent action on such difficultly soluble materials as stearic acid. Moreover, the methoxy acetic acid formed from the methoxy acetic anhydride during the esterification is likewise a strong and satisfactory solvent of the high fatty acids. There is, therefore, no danger of premature precipitation of the ingredients as the reaction proceeds. While the general range of available temperatures is indicated above, we find it especially convenient to work between 50° C. and 80° C., according to the particular acids and alkoxy fatty acid anhydrides employed. As will be seen by the examples hereinafter given, a rapid esterification may be accomplished in a comparatively short time, without degradation of the product, at a temperature of 60° to 65° C., when ethoxy acetic anhydride and magnesium perchlorate are employed.

Our process can utilize cellulosic materials from any of the sources customarily used in the manufacture of esters, such as cotton fiber tissue paper, clean cotton, surgical cotton wool, and even sulfite wood pulp, (preferably bleached). These materials, especially the cotton materials, are undegraded when they enter our process and yield esters which are likewise substantially unimpaired or undegraded, as evidenced by the flexibility of films prepared from them. But our process is likewise applicable to cellulosic materials which have been chemically affected, such as so-called hydrocellulose, reverted cellulose, such as from the viscouse or cuprammonium processes and also lower cellulose nitrates, acetates, formates, or ethers still containing esterifiable hydroxyls, in fact, such cellulosic materials are important starting materials in producing the mixed esters.

Examples of our process are as follows, although it will be understood that an alkoxy aliphatic anhydride may be substituted for chloracetic anhydride in any of the examples or processes given in our United States application Serial No. 179,177 in chemically equivalent amount.

I. A bath was prepared by mixing 500 lbs. glacial acetic acid, 600 lbs. of ethoxy acetic anhydride and 1 lb. of magnesium perchlorate trihydrate. There was then incorporated in this mixture 100 lbs. of clean cotton. The bath was kept at 60–65° C. until the cotton fibers disappeared. The bath was precipitated in cold methyl alcohol and the precipitate was washed and dried. The resulting product was found to be soluble in chloroform.

The following examples illustrate other proportions and ingredients which may be used in our process. Each example is unless otherwise indicated carried out substantially similar to the procedure of Example I.

II. 1200 lbs. methoxy acetic anhydride, 400 lbs. methoxy acetic acid, 740 lbs. commercial stearic acid (which is a mixture of stearic and palmitic acids), 130 lbs. glacial acetic acid, 2 lbs. magnesium perchlorate, 100 lbs. of cellulosic material.

III. 500 lbs. ethoxy acetic anhydride, 200 lbs. acetic anhydride, 700 lbs. stearic acid, 2 lbs. paratoluene-sulfo-chloride, 100 lbs. of cellulose.

IV. 300 lbs. ethoxy acetic anhydride, 300 lbs. ethoxy acetic acid, 200 lbs. commercial stearic acid, 10 lbs. para-toluene-sulfo-chloride, 100 lbs. cellulose acetate (37.5% acetyl content).

The mass was maintained at 50° C. for about 48 hours. Final product has 38% stearyl content.

V. 300 lbs. methoxy acetic anhydride, 200 lbs. ethylene chloride, 200 lbs. commercial stearic acid, 10 lbs. para-toluene-sulfo-chloride, 100 lbs. cellulose acetate (36% acetyl).

VII. 300 lbs. methoxy acetic anhydride, 200 lbs. stearic acid, 1,000 lbs. ligroin, 10 lbs. paratoluene-sulfo-chloride, 100 lbs. of cellulose acetate (40% acetyl) at a temperature about the boiling point of the ligroin (90°–120° C.)

VIII. 700 lbs. propoxy acetic anhydride, 200 lbs. acetic anhydride, 700 lbs. stearic acid, 2 lbs. fused zinc chloride, 100 lbs. cellulosic material.

IX. 300 lbs. ethoxy acetic anhydride, 300 lbs. methyl methoxy acetate, 150 lbs. lauric acid, 10 lbs. benzene-sulfonic acid, 100 lbs. cellulose acetate (37.5% acetyl).

In the examples which employ cellulose acetate as the cellulosic material the amount of stearyl introduced into the cellulose molecule may be regulated by the content of acetyl groups in the acetate or, in other words, by the esterifiable hydroxyls present in the cellulose acetate. For instance, if a cellulose acetate stearate of high stearyl content is desired, the cellulose acetate used has a low acetyl content or vice versa.

While the foregoing examples give all the description necessary to carry out the esterification process, if desired, the details given above may be supplemented by reference to the disclosure of United States application Serial No. 179,177. Instead of the alkoxy acetic anhydride, the alkoxy anhydrides of homologous fatty acids such as propionic, butyric, etc., may be employed as the impelling agents if desired.

The examples which employ commercial stearic acid illustrate that a mixture of various fatty acids may be employed in our process as is explained in our application No. 179,177. In the claims, therefore, where an acid is referred to, it will be understood to denote either the pure acid or the commercial grade. Also, if desired, various mixtures of impelling anhydrides may be employed in place of the individual anhydride. For example, a simple fatty acid anhydride or a halogen substituted fatty acid anhydride or both may be mixed with the alkoxy fatty acid anhydride, if desired, to compose the anhydride material which may be used in our process.

It will be evident from the above description that we can produce a very large variety of esters of technical importance for the preparation of flexible, transparent photographic films, of filaments for making rayon, of lacquers, of artificial leather, of plastics and other fields in the same manner in which cellulose esters have hitherto been employed. Many of the esters of the higher fatty acids and the aceto higher fatty acids have qualities which give them exceptional adaptability in this art. For example, they give flexible film or filaments without softeners or plastifiers; but the acetone-soluble or chloroform-soluble plastifiers, heretofore used with cellulose acetates, may be used with them. Triphenyl and tricresyl phosphates are good examples of the large number which can be used within the usual range of proportions. They can be mixed or laminated with cellulose nitrate or acetate by means of a common solvent. They can be backed with a cellulose acetate layer or with hygroscopic nitrocellulose coatings to prevent static, and these backings may have their electrical conductance improved by containing hygroscopic compounds.

What we claim as our invention and desire to secure by Letters Patent of the United States is:

1. A process of making cellulose esters which comprises acylating cellulose or a cellulose compound containing an esterifiable hydroxyl group with a reaction mixture containing an alkoxy fatty acid anhydride and an acid selected from the group which consists of the unsubstituted aliphatic monocarboxylic acids including the cycloparaffinic, the aromatic monocarboxylic, and the aralkyl-monocarboxylic acids.

2. A process of making cellulose esters which comprises acylating cellulose or a cellulose compound containing an esterifiable hydroxyl group with a reaction mixture containing an ethoxy fatty acid anhydride and an acid selected from the group which consists of the unsubstituted aliphatic monocarboxylic acids including the cycloparaffinic, the aromatic monocarboxylic, and the aralkyl-monocarboxylic acids.

3. A process of making cellulose esters which comprises acylating cellulose or a cellulose compound containing an esterifiable hydroxyl group with a reaction mixture containing an alkoxy fatty acid anhydride, a solvent for the cellulose esters which are produced and an acid selected from the group which consists of the unsubstituted aliphatic monocarboxylic acids including the cycloparaffinic, the aromatic monocarboxylic, and the aralkyl-monocarboxylic acids.

4. A process of making cellulose esters which comprises acylating cellulose or a cellulose compound containing an esterifiable hydroxyl group with a reaction material containing an alkoxy acetic anhydride and an acid selected from the group which consists of the unsubstituted aliphatic monocarboxylic acids including the cycloparaffinic, the aromatic monocarboxylic and the aralkyl-monocarboxylic acids.

5. A process of making cellulose esters which comprises acylating cellulose or a cellulose compound containing an esterifiable hydroxyl group with a reaction mixture containing ethoxy acetic anhydride and an acid selected from the group which consists of the unsubstituted aliphatic monocarboxylic acids including the cycloparaffinic, the aromatic monocarboxylic and the aralkyl-monocarboxylic acids.

6. A process of making cellulose esters which comprises acylating cellulose or a cellulose compound containing an esterifiable hydroxyl group with a reaction mixture containing ethoxy acetic anhydride and a solvent for the cellulose esters which are produced and an acid selected from the group which consists of the unsubstituted aliphatic monocarboxylic acids including the cycloparaffinic, the aromatic monocarboxylic and the aralkyl-monocarboxylic acids.

7. A process of making organic esters of cellulose which comprises acylating cellulose acetate with a reaction mixture containing an alkoxy fatty acid anhydride and an acid selected from the group which consists of the unsubstituted aliphatic monocarboxylic including the cycloparaffinic, the aromatic monocarboxylic acids and the aralkyl monocarboxylic acids.

8. A process of making organic esters of cellulose which comprises treating cellulose acetate with a reaction mixture containing an ethoxy fatty acid anhydride and an acid selected from the group which consists of the unsubstituted aliphatic monocarboxylic acids including the cycloparaffinic, the aromatic monocarboxylic acids and the aralkyl monocarboxylic acids.

9. A process of making organic esters of cellulose which comprises treating cellulose acetate with a reaction mixture containing an alkoxy fatty acid anhydride, a solvent for the cellulose esters produced and an acid selected from the group which consists of the unsubstituted aliphatic monocarboxylic acids including the cycloparaffinic, the aromatic monocarboxylic acids and the aralkyl monocarboxylic acids.

10. A process of making organic esters of cellulose which comprises treating cellulose acetate with a reaction mixture containing an alkoxy acetic anhydride and an acid selected from the group which consists of the unsubstituted aliphatic monocarboxylic aralkyl-monocarboxylic acids.

11. A process of making organic esters of cellulose which comprises treating cellulose acetate with a reaction mixture containing an ethoxy acetic anhydride and an acid selected from the group which consists of the unsubstituted aliphatic monocarboxylic acids including the cycloparaffinic, the aromatic monocarboxylic acids and the aralkyl monocarboxylic acids.

12. A process of making organic esters of cellulose which comprises treating cellulose acetate with an ethoxy acetic anhydride, a solvent for the cellulose esters produced and an acid selected from the group which consists of the unsubstituted aliphatic monocarboxylic acids including the cycloparaffinic, the aromatic monocarboxylic acids and the aralkyl monocarboxylic acids.

13. A process of making organic esters of cellulose which comprises acylating cellulose or a cellulose compound containing an esterifiable hydroxyl group with a reaction mixture containing an alkoxy-fatty acid anhydride and an acid selected from the group consisting of lauric, myristic, palmitic, stearic, propionic and butyric acids.

14. A process of making organic esters of cellulose which comprises acylating cellulose or a cellulose compound containing an esterifiable hydroxyl group with a reaction mixture containing an alkoxy-acetic anhydride and an acid selected from the group consisting of lauric, myristic, palmitic, stearic, propionic and butyric acids.

15. A process of making organic esters of cellulose which comprises acylating cellulose or a cellulose compound containing an esterifiable hydroxyl group with a reaction mixture containing an ethoxy-acetic anhydride and an acid selected from the group consisting of lauric, myristic, palmitic, stearic, propionic and butyric acids.

16. A process of making organic esters of cellulose which comprises acylating cellulose or a cellulose compound containing an esterifiable hydroxyl group with a reaction mixture containing an alkoxy-acetic anhydride, a solvent for the cellulose esters produced and an acid selected from the group consisting of lauric, myristic, palmitic, stearic, propionic, and butyric acids.

17. A process of making organic esters of cellulose which comprises treating cellulose or a cellulose compound containing an esterifiable hydroxyl group with a reaction mixture comprising stearic acid and an alkoxy fatty acid anhydride.

18. A process of making organic esters of cellulose which comprises treating cellulose acetate with a reaction mixture comprising stearic acid and an alkoxy acetic anhydride.

19. A process of making organic esters of cellulose which comprises treating cellulose or a cellulose compound containing an esterifiable hydroxyl group with a reaction mixture comprising stearic acid and an ethoxy fatty acid anhydride.

20. A process of making organic esters of cellulose which comprises treating cellulose acetate with a reaction mixture comprising stearic acid and an ethoxy acetic anhydride.

21. Cellulose acetate-stearate.

22. A process of making cellulose acetate which comprises acetylating cellulose with a reaction mixture containing acetic acid and an alkoxy fatty acid anhydride.

23. A process of making organic esters of cellulose which comprises acylating cellulose or a cellulose compound containing an esterifiable hydroxyl group with a reaction mixture containing an alkoxy fatty acid anhydride, an alkoxy acetic acid and an acid selected from the group consisting of the unsubstituted aliphatic monocarboxylic acids including the cycloparaffinic, the aromatic monocarboxylic and the aralkyl monocarboxylic acids.

24. A process of making organic esters of cellulose which comprises acylating cellulose or a cellulose compound containing an esterifiable hydroxyl group with a reaction mixture containing an alkoxy fatty acid anhydride, ethoxy acetic acid and an acid selected from the group consisting of the unsubstituted aliphatic monocarboxylic acids including the cycloparaffinic the aromatic monocarboxylic and the aralkyl monocarboxylic acids.

25. A process of making organic esters of cellulose which comprises acylating cellulose or a cellulose compound containing an esterifiable hydroxyl group with a reaction mixture containing ethoxy acetic anhydride, an alkoxy acetic acid and an acid selected from the group consisting of the unsubstituted aliphatic monocarboxylic acids including the cycloparaffinic, the aromatic monocarboxylic and the aralkyl monocarboxylic acids.

26. A process of making organic esters of cellulose which comprises acylating cellulose or a cellulose compound containing an esterifiable hydroxyl group with a reaction mixture containing ethoxy acetic anhydride, ethoxy acetic acid and an acid selected from the group consisting of the unsubstituted aliphatic monocarboxylic acids including the cycloparaffinic, the aromatic monocarboxylic and the aralkyl monocarboxylic acids.

27. The process of acylating cellulose in the presence of alkoxy acetic acid.

28. The process of acylating cellulose in the presence of ethoxy acetic acid.

29. A process of making organic esters of cellulose which comprises reacting upon a cellulose or a cellulose compound containing an esterifiable hydroxyl group with an acylating bath containing an alkoxy fatty acid anhydride.

30. A process of making organic esters of cellulose which comprises reacting upon a cellulose or a cellulose compound containing an esterifiable hydroxyl group with an acylating bath containing an alkoxy acetic anhydride.

31. A process of making organic esters of cellulose which comprises reacting upon a cellulose or a cellulose compound containing an esterifiable hydroxyl group with an acylating bath containing ethoxy acetic anhydride.

HANS T. CLARKE.
CARL J. MALM.